United States Patent
Soldevila et al.

(10) Patent No.: US 9,626,594 B2
(45) Date of Patent: Apr. 18, 2017

(54) METHOD AND SYSTEM TO PERFORM TEXT-TO-IMAGE QUERIES WITH WILDCARDS

(71) Applicant: Xerox Corporation, Norwalk, CT (US)

(72) Inventors: Albert Gordo Soldevila, Grenoble (FR); José Antonio Rodríguez-Serrano, Nottingham (GB); Florent Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 30 days.

(21) Appl. No.: 14/601,802

(22) Filed: Jan. 21, 2015

(65) Prior Publication Data

US 2016/0210532 A1  Jul. 21, 2016

(51) Int. Cl.
*G06K 9/62* (2006.01)
*G06K 9/52* (2006.01)
*G06K 9/00* (2006.01)
*G06K 9/18* (2006.01)
*G06K 9/32* (2006.01)
*G06K 9/46* (2006.01)

(52) U.S. Cl.
CPC ....... *G06K 9/6215* (2013.01); *G06K 9/00624* (2013.01); *G06K 9/18* (2013.01); *G06K 9/325* (2013.01); *G06K 9/46* (2013.01); *G06K 9/4676* (2013.01); *G06K 9/52* (2013.01); *G06K 9/6256* (2013.01)

(58) Field of Classification Search
CPC ........ G06K 9/6215; G06K 9/18; G06K 9/325; G06K 9/46; G06K 9/4676; G06K 9/52; G06K 9/6256
See application file for complete search history.

(56) References Cited

U.S. PATENT DOCUMENTS

| | | |
|---|---|---|
| 7,680,330 B2 | 3/2010 | Leung |
| 8,416,999 B2 | 4/2013 | Ogawa |
| 8,452,108 B2 | 5/2013 | Walch |
| 8,488,904 B2 | 7/2013 | Tsurumi |
| 8,489,585 B2 | 7/2013 | Larlus et al. |
| 8,582,819 B2 | 11/2013 | Rodriguez-Serrano et al. |

(Continued)

OTHER PUBLICATIONS

Rodriguez-Serrano, "Label embedding for text recognition," 2013, Proc. BMVC., pp. 1-11.*

(Continued)

*Primary Examiner* — David F Dunphy
(74) *Attorney, Agent, or Firm* — Fay Sharpe LLP

(57) ABSTRACT

A system and method for comparing a text image with or without a wildcard character and a character string are provided. The method includes embedding a character string into a vectorial space by extracting a set of features from the character string and generating a character string representation based on the extracted features, such as a spatial pyramid bag of characters (SPBOC) representation. A text image is embedded into a vectorial space by extracting a set of features from the text image and generating a text image representation based on the text image extracted features. A similarity between the text image representation and the character string representation is computed, which includes computing a function of the text image representation and character string representation.

3 Claims, 6 Drawing Sheets

(56) References Cited

U.S. PATENT DOCUMENTS

| | | | |
|---|---|---|---|
| 8,588,470 | B2 | 11/2013 | Rodriguez-Serrano et al. |
| 2003/0021481 | A1 | 1/2003 | Kasutani |
| 2007/0005356 | A1 | 1/2007 | Perronnin |
| 2007/0258648 | A1 | 11/2007 | Perronnin |
| 2008/0069456 | A1 | 3/2008 | Perronnin |
| 2008/0240572 | A1 | 10/2008 | Hoshii |
| 2008/0317358 | A1 | 12/2008 | Bressan et al. |
| 2009/0144033 | A1 | 6/2009 | Liu et al. |
| 2009/0208118 | A1 | 8/2009 | Csurka |
| 2010/0040285 | A1 | 2/2010 | Csurka et al. |
| 2010/0082615 | A1 | 4/2010 | Clinchant et al. |
| 2010/0092084 | A1 | 4/2010 | Perronnin et al. |
| 2010/0098343 | A1 | 4/2010 | Perronnin et al. |
| 2010/0189354 | A1 | 7/2010 | de Campos et al. |
| 2010/0191743 | A1 | 7/2010 | Perronnin et al. |
| 2010/0205123 | A1* | 8/2010 | Sculley ............... H04L 63/1408 706/12 |
| 2010/0226564 | A1 | 9/2010 | Marchesotti et al. |
| 2010/0318477 | A1 | 12/2010 | Perronnin et al. |
| 2011/0026831 | A1 | 2/2011 | Perronnin et al. |
| 2011/0040711 | A1 | 2/2011 | Perronnin et al. |
| 2011/0052063 | A1 | 3/2011 | McAuley et al. |
| 2011/0072012 | A1 | 3/2011 | Ah-Pine et al. |
| 2011/0091105 | A1 | 4/2011 | Perronnin |
| 2011/0137898 | A1 | 6/2011 | Gordo et al. |
| 2011/0184950 | A1 | 7/2011 | Skaff et al. |
| 2012/0045134 | A1 | 2/2012 | Perronnin et al. |
| 2012/0076401 | A1 | 3/2012 | Sanchez et al. |
| 2012/0143853 | A1 | 6/2012 | Gordo et al. |
| 2012/0158739 | A1 | 6/2012 | Ah-Pine et al. |
| 2013/0132410 | A1* | 5/2013 | Rineer ............... G06F 17/30985 707/758 |
| 2014/0245123 | A1* | 8/2014 | Pircher ............... G06F 17/241 715/232 |

OTHER PUBLICATIONS

U.S. Appl. No. 13/300,124, filed Nov. 18, 2011, Rodríguez-Serrano et al.

U.S. Appl. No. 13/224,373, filed Sep. 2, 2011, Rodríguez-Serrano et al.

U.S. Appl. No. 13/458,464, filed Apr. 27, 2012, Rodríguez-Serrano et al.

U.S. Appl. No. 13/351,038, filed Jan. 16, 2012, Rodríguez-Serrano et al.

U.S. Appl. No. 13/527,228, filed Jun. 19, 2012, Skaff, et al.

U.S. Appl. No. 13/757,014, filed Feb. 1, 2013, Rodríguez-Serrano et al.

U.S. Appl. No. 14/054,998, filed Oct. 16, 2013, Rodríguez-Serrano et al.

Anagnostopoulos, et al. "License Plate Recognition From Still Images and Video Sequences: A Survey", IEEE Transactions on Intelligent Transportation Systems, vol. 9, No. 3, Sep. 2008, pp. 377-391.

Perronnin, et al. "Improving the Fisher Kernel for Large-Scale Image Classification", ECCV'10, 2010, pp. 143-156.

Lowe, D. "Distinctive image features from scale-invariant keypoints", IJCV 2004, 60(2), pp. 91-110.

Perronnin, et al. "Fisher kernels on visual vocabularies for image categorization." Computer Vision and Pattern Recognition, CVPR'07 , pp. 1-8.

Sanchez, et al. "High-dimensional signature compression for large-scale image classification" CVPR 2011, pp. 1665-1672.

Perronnin, et al. "Large-scale image categorization with explicit data embedding" CVPR 2010, pp. 2297-2304.

Schölkopf, et al. "Non-linear component analysis as a kernel eigenvalue problem" Neural Computation, Jul. 1, 1998, vol. 10, No. 5, pp. 1299-1319.

Joachims, T. "Optimizing Search Engines using Clickthrough Data", *Proc. of the 8th ACM SIGKDD Intl. Conf. on Knowledge discovery and data mining*, 2002, pp. 133-142.

Lazebnik, et al. "Beyond Bags of Features: Spatial Pyramid Matching for Recognition Natural Scene Categories", CVPR, 2006, vol. 2, pp. 2169-2178.

Lecun, et al. "Efficient backprop." *Neural networks: Tricks of the trade* (1998): 546-546.

Nowozin, et al. "Structured Learning and prediction in computer vision" Foundations and Trends in Computer Graphics and Vision, 2010, vol. 6, Nos. 3-4, pp. 185-365.

Plamondon, et al. "On-line and off-line handwriting recognition: a comprehensive survey" IEEE Trans. Pattern Anal. Mach. Intell., 2002, 22(1):63-84.

Rodríguez-Serrano et al., Label-embedding for Text Recognition, BMVC, 2013, p. 1-11.

Tsochantaridis, et al. "Large margin method for structured and interdependent output variables", JMLR, 2005, pp. 1453-1484.

Williams, et al. "Using the Nystrom method to speed up kernel machines" NIPS 2001, pp. 682-688.

\* cited by examiner

METHOD AND SYSTEM TO PERFORM TEXT-TO-IMAGE QUERIES WITH WILDCARDS

CROSS REFERENCE TO RELATED PATENTS AND APPLICATIONS

U.S. Patent Publication No. 2014/0219563, published Aug. 7, 2014, by Rodriguez-Serrano et al., entitled "LABEL-EMBEDDING FOR TEXT RECOGNITION", is incorporated herein by reference in its entirety.

BACKGROUND

The exemplary embodiment relates to text recognition in images. It finds particular application in connection with recognizing license plates and will be described with particular reference thereto. However, it is to be appreciated that it is applicable to a wide range of recognition problems.

Text recognition in images involves both recognizing that a portion of the image contains text and also recognizing the character sequence which constitutes the text. There are many instances where it is desirable to recognize text in images, for example, recognition of license plate numbers in images of vehicles, recognition of street names on images of street scenes, and the like. It may also be desirable to recognize different types of text (e.g., typed text vs. handwritten text) and to recognize different types of images (e.g., natural images vs. document images).

Recognition of license plate information assists in vehicle recognition, since in general the license plate is a unique identifier for the vehicle on which it is mounted. In the past, this problem has been traditionally addressed by applying Optical Character Recognition (OCR) on the license plate image. See, for example, Anagnostopoulos, et al., "License plate recognition from still images and video sequences: A survey," IEEE Trans. on Intelligent Transportation Systems, vol. 9, No. 3, pp. 377-391, 2008, hereinafter "Anagnostopoulos"). However, OCR recognition can be computationally expensive and accuracy diminishes when the visibility at the time of capturing the image is poor.

A recent solution has been to address recognition as an image matching problem, as disclosed, for example, in copending U.S. application Ser. No. 13/300,124, filed on Nov. 18, 2011, by Jose Antonio Rodriguez-Serrano et al., entitled "METHODS AND SYSTEMS FOR IMPROVED LICENSE PLATE SIGNATURE MATCHING BY SIMILARITY LEARNING ON SYNTHETIC IMAGES". Given an image of a license plate (the query), the license plate number of the closest matching images in a large database are retrieved. The images to be compared are each represented by an image signature, which is a statistical representation of an image, derived from low-level features extracted from the image. As image signatures, Fisher Vectors can be used. See, for example. Perronnin, et al., "Improving the Fisher kernel for large-scale image classification," in ECCV, 2010.

The signature comparison method assumes that at least one example of the query is already present in the database. While this is often not an issue in some applications (for example, in the context of a parking application where an image taken at the exit is being matched to images taken at the entry), there are many instances where such a database is not available or is incomplete. One way that this could be addressed is by generating artificial license plates. For example, U.S. patent application Ser. No. 13/224,373, filed on Sep. 2, 2011, by Jose Antonio Rodriguez Serrano, et al., entitled "TEXT-BASED SEARCHING OF IMAGE DATA", discloses a method for creation of virtual license plates by combining similar license plates. U.S. patent application Ser. No. 13/300,124, filed on Nov. 18, 2011, by Jose Antonio Rodriguez-Serrano et al., entitled "METHODS AND SYSTEMS FOR IMPROVED LICENSE PLATE SIGNATURE MATCHING BY SIMILARITY LEARNING ON SYNTHETIC IMAGES" and U.S. patent application Ser. No. 13/458,464, filed Apr. 27, 2012, by Jose Antonio Rodriguez-Serrano et al., "ENTITLED METHODS AND SYSTEMS FOR IMPROVING YIELD IN WANTED VEHICLE SEARCHES", disclose methods for synthesizing license plate images.

The first of these methods is focused on retrieval and yields good results in terms of accuracy when the goal is to ensure that the license plate will likely be among the most similar retrieved images (e.g., among the top 20). This is generally sufficient for manually assisted search applications, but can pose problems for recognition, where usually a high top-1 accuracy is desired, i.e., it is desired to identify a single match with a high degree of accuracy, where a match is actually present. The second method can generate photo-realistic images of license plates from a given sequence of characters. However, it relies on a certain prior knowledge of the domain of application (e.g., license plate background, font, and the like). Additionally, multiple images are typically generated with different transformations to account for a set of representative plate distortions, which can be computationally expensive.

The disclosed method and system of performing text-to-image queries finds application in the context of vehicle re-identification systems, such as systems to automatically manage vehicle entries and exits in parking lots. Specifically, vehicle re-identification systems that capture and analyze a license plate image associated with a vehicle. A conventional approach to identify a vehicle is to extract a license plate number using an Automatic License Plate Recognition (ALPR) system and generating an exact license plate number lookup database including all plate numbers of entered vehicles.

This approach to re-identification has two main limitations:

First, the accuracy of ALPR systems is limited. Despite the claims of some ALPR providers, the re-identification accuracy of performing ALPR+exact string matching has been measured to be in the range 85%-90% in real production environments where images are captured from managed vehicle parking lots using existing image capture and ALPR equipment. Furthermore, the re-identification accuracy of performing ALPR and exact string matching has been measured to be as low as 70% in challenging conditions such as outdoor car parks with non-frontal cameras.

Second, recognizing and storing any license plate number can pose a privacy concern, as it explicitly reveals a nominal piece of information, i.e., a license plate number is considered personal information in many countries including France.

In U.S. patent application Ser. No. 14/054,998, filed Oct. 16, 2013, by RODRÍGUEZ-SERRANO et al., entitled "DELAYED VEHICLE IDENTIFICATION FOR PRIVACY ENFORCEMENT", disclosed is a system to perform re-identification based on image signature matching, which can obtain higher accuracy results than commercial ALPR systems and does not pose privacy concerns. U.S. patent application Ser. No. 14/497,417, filed Sep. 26, 2014, by Rodriguez-Serrano et al., entitled "MULTI-QUERY PRIVACY-PRESERVING PARKING MANAGEMENT SYS- TEM AND METHOD", extends the system disclosed in U.S. patent application Ser. No. 14/054,998, filed Oct. 16, 2013, by RODRÍGUEZ-SERRANO et al., entitled "DELAYED VEHICLE IDENTIFICATION FOR PRIVACY ENFORCEMENT", to allow the retrieval of license plate images from query strings, i.e. a user types in a license plate number and images of the corresponding license plate are returned. This enables, among other operations, to recover the entry time of users with lost tickets, to perform security checks, or to enable "where is my car" searches.

In addition to a system and method for recognizing text in images which is both sufficiently accurate for a particular application and computationally efficient, needed is a method and system to enable text queries with wildcards symbols, e.g., queries of the form ?BC12?, where the symbol ? stands for "any character", thus, for example, ABC123 and ZBC127 would match the query. The ability to handle text queries with wildcard symbols is necessary because in many practical situations the issuer of the query does not know the subject license plate in its entirety. While such a query with wildcards is possible in ALPR based systems, where a database of possible license plate numbers is maintained, text-to-image matching does not currently provide the ability to handle, efficiently, text queries with wildcard symbols.

Provided herein is a method and system to perform text-to-image matching with or without wildcards, e.g., retrieval of license plate images from string queries with wildcards.

INCORPORATION BY REFERENCE

The following references, the disclosures of which are incorporated herein by reference in their entireties, are mentioned:

U.S. Patent Publication No. 2010/0226564, published Sep. 9, 2010, by Luca Marchesotti et al., entitled "FRAMEWORK FOR IMAGE THUMBNAILING BASED ON VISUAL SIMILARITY";

U.S. Patent Publication No. 2012/0143853, published on Jun. 7, 2012, by Albert Gordo, et al., entitled "LARGE-SCALE ASYMMETRIC COMPARISON COMPUTATION FOR BINARY EMBEDDINGS";

U.S. application Ser. No. 13/224,373, filed on Sep. 2, 2011, by Jose Antonio Rodriguez Serrano, et al., entitled "TEXT-BASED SEARCHING OF IMAGE DATA";

U.S. patent application Ser. No. 13/300,124, filed on Nov. 18, 2011, by Jose Antonio Rodriguez-Serrano et al., entitled "METHODS AND SYSTEMS FOR IMPROVED LICENSE PLATE SIGNATURE MATCHING BY SIMILARITY LEARNING ON SYNTHETIC IMAGES";

U.S. patent application Ser. No. 13/458,464, filed Apr. 27, 2012, by Rodriguez-Serrano et al., "ENTITLED METHODS AND SYSTEMS FOR IMPROVING YIELD IN WANTED VEHICLE SEARCHES";

U.S. patent application Ser. No. 13/351,038, filed on Jan. 16, 2012, Rodriguez-Serrano, entitled "IMAGE SEGMENTATION BASED ON APPROXIMATION OF SEGMENTATION SIMILARITY";

U.S. patent application Ser. No. 13/527,228, filed Jun. 19, 2012, by Skaff et al., entitled "OCCUPANCY DETECTION FOR MANAGED LANE ENFORCEMENT BASED ON LOCALIZATION AND CLASSIFICATION OF WINDSHIELD IMAGES";

U.S. patent application Ser. No. 13/757,014, filed Feb. 1, 2013, by Rodriguez-Serrano et al., entitled "LABEL-EMBEDDING FOR TEXT RECOGNITION";

U.S. patent application Ser. No. 14/054,998, filed Oct. 16, 2013, by Rodriguez-Serrano et al., entitled "DELAYED VEHICLE IDENTIFICATION FOR PRIVACY ENFORCEMENT";

U.S. patent application Ser. No. 14/497,417, filed Sep. 26, 2014, by Rodriguez-Serrano et al., entitled "MULTI-QUERY PRIVACY-PRESERVING PARKING MANAGEMENT SYSTEM AND METHOD";

C. BISHOP, "TRAINING WITH NOISE IS EQUIVALENT TO TIKHONOV REGULARIZATION", Neural Computation, 1995, 8 pages;

PERRONNIN et al., "IMPROVING THE FISHER KERNEL FOR LARGE-SCALE IMAGE CLASSIFICATION", In ECCV, 2010, pages 1-14;

RODRIGUEZ et al., "LABEL-EMBEDDING FOR TEXT RECOGNITION", in BMVC, 2013, pages 1-11, are incorporated herein by reference in their entirety.

BRIEF DESCRIPTION

In one embodiment of this disclosure, described is a method for comparing a text image and a character string, the character string including a wildcard character comprising: embedding the character string without the wildcard character into a vectorial space by extracting a set of features from the character string and generating a character string representation based on the extracted character string features; embedding the text image into a vectorial space by extracting a set of features from the text image and generating a text image representation based on the extracted text image features; and computing a similarity between the text image representation and character string representation without the wildcard character by computing a function of the text image representation and character string representation without the wildcard character, wherein at least one of the embedding and the computing of the compatibility is performed with a processor.

In another embodiment of this disclosure, described is a system for comparing a text image and a character string including a wildcard character comprising: a text string representation generator for generating a character string representation based on features extracted from a character string including a wildcard character, the character string consisting of a sequence of characters, the text string representation including a spatial pyramid bag of characters representation; a text image representation generator for generating a text image representation based on features extracted from a text image; a comparator for computing a similarity between the text image representation and the character string representation; an output component for outputting information based on the computed similarity between at least one character string representation and at least one text image representation; and a processor which implements the text string representation generator, text image representation generator; comparator, and output component.

In still another embodiment of this disclosure, described is a method for comparing a text image and a character string comprising: for at least one character string comprising a sequence of characters including a wildcard character, extracting a set of features from the character string, comprising partitioning the character string to form a spatial pyramid of regions and for each region, generating a representation of the region comprising counting occurrences of each of a finite set of characters in the region; generating a character string representation based on the region representations; extracting a set of features from the text image and generating a text image representation based thereon; and computing a similarity between the text image representation and the character string representation comprising embedding at least one of the character string representation and the text image representation with a matrix of learned parameters, the compatibility being a function of the at least one embedded representation, wherein at least one of the embedding and the computing of the compatibility is performed with a processor.

DETAILED DESCRIPTION

Aspects of the exemplary embodiment relate to a system and method for recognizing text in images which relies on a representation of a sequence of characters, such as a license plate number. This representation is referred to herein as a Spatial Pyramid Bag-Of-Characters (SPBOC) in which the characters are drawn from a predefined vocabulary (letters of the alphabet and numbers in the case of license plate numbers). The representation is derived from segmenting a character string into progressively smaller segments, in a pyramidal fashion, each segment being associated with a respective sub-representation which is a function of the characters in the respective segment. The sub-representations are aggregated to form a representation of the sequence as a whole.

In addition, this disclosure provides a method and system to perform text-to-image queries where wildcards may or may not appear in the textual query. Wildcards may be handled only at testing time, or at both training and testing time. At only testing time, they can be ignored, marginalized over all possible license plate numbers, or maximized over all possible license plate numbers. At training time, queries with wildcards can be synthesized. To use for training, they can also be ignored, marginalized over, or replaced with a wildcard symbol.

The problem of interest is the recognition of text in images, especially natural images containing text. Despite building on the mature field of Optical Character Recognition (OCR), understanding text in natural scenes, as opposed to text in clean documents, still poses significant challenges. Some difficulties are the use of multiple fonts, colors, or artistic designs, the textured backgrounds or the irregular character placement.

Figure 1:
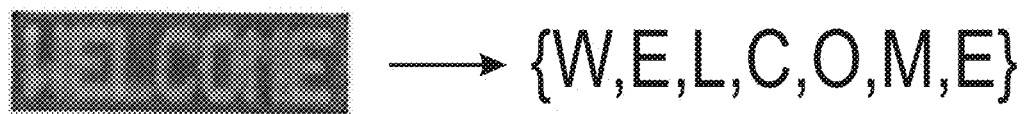
FIG. 1 illustrates word recognition, where the input is a segmented image of a word and the output is a sequence of characters contained in the word, usually constrained by a lexicon of valid words.

The focus of the disclosed method and system to perform text-to-image queries, with and without wildcard characters, is fundamentally known as word recognition, illustrated in FIG. 1. The problem consists of decoding a sequence of characters present in a cropped image of a word, typically the output of a text detector. Usually, the sequence of characters is constrained to be an element from a list of valid words, which is referred to as lexicon in OCR terminology.

Research in text recognition has converged to methods that classify local image regions into one of the potential characters, and then use a high-level model that imposes a global agreement.

This bottom-up decomposition is beneficial because:

(i) the problem of recognizing potentially thousands of word classes reduces to learning a few dozens of character models plus a high-level model, and (ii) it allows recognizing words not seen during training. This second situation is referred to as zero-shot learning. The disadvantage is that the methods are sensitive to the character detection and classification step, and that this usually implies pre-processing (e.g., binarize the image to improve character classification) and post-processing, e.g. apply a string edit correction of the output to the closest lexicon word.

This disclosure and the exemplary embodiments provided herein takes an opposite direction to the classical bottom-up recognition methods, advocating that it is possible to perform text recognition without explicitly detecting or classifying characters, with a surprisingly high accuracy, using a "frugal" approach. The approach makes use of learned similarities between global word-image descriptors and word-label descriptors. Thus, the recognition process is cast as a simple nearest neighbor search between global descriptors. Yet it achieves an accuracy comparable to existing systems such as an industrial OCR and a recent approach based on conditional random fields. See Mishra, A., Alahari, K., Jawahar, C. V.: Scene text recognition using higher order language priors. In: BMVC (2012).

Figure 2:
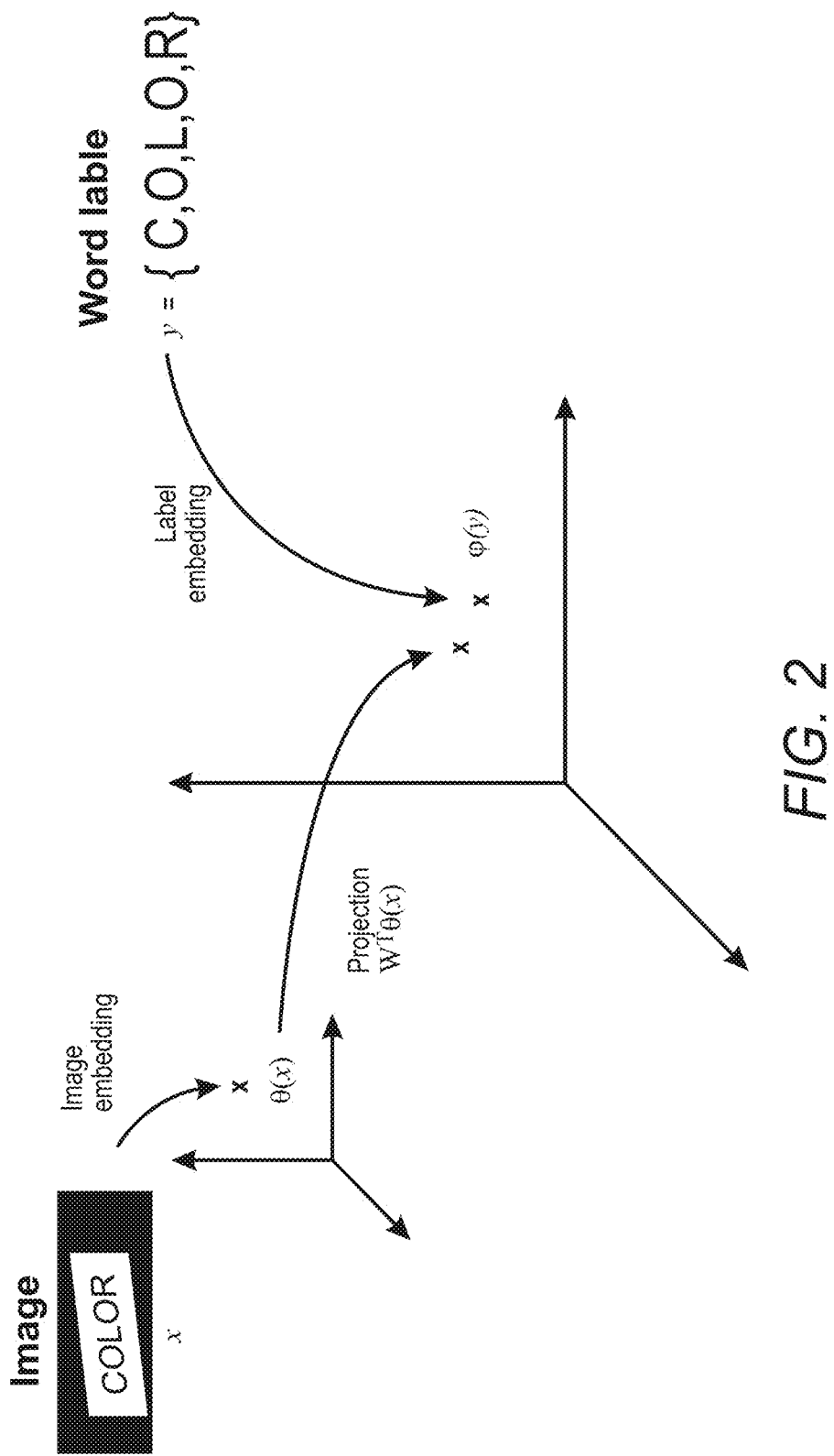
FIG. 2 illustrates label embedding-based recognition and associated notations according to an exemplary embodiment of this disclosure. The relevance of an image x to a textual label y is measured by a direct distance between embeddings θ(x) and φ(y) in the common space given by the learned projection W.

More specifically, in the approach provided herein, every label from a lexicon is embedded to a Euclidean vector space. This step is referred to as label embedding. Each vector of image features is then projected to this space. To that end, the problem is formulated in a structured support vector machine (SSVM) framework (see Nowozin, S., Lampert, C.: Structured learning and prediction in computer vision. Foundations and Trends in Computer Graphics and Vision (2011)) and the linear projection is learned that optimizes a proximity criterion between word images and their corresponding labels. In this common space, the "compatibility" between a word image and a label is measured as the dot product between their representations. Hence, given a new word image, recognition amounts to finding the closest label in the common space, as shown in FIG. 2.

This approach has several advantages. First, it does not require ad-hoc or costly pre-/post-processing operations such as image binarization or string edit correction. Second, it can build on top of any state-of-the-art image descriptor. Fisher vectors are used for the exemplary embodiments described, see Perronnin, F., Dance, C.: Fisher kernels on visual vocabularies for image categorization, In: CVPR (2007) and Perronnin, F., Sanchez, J., Mensink, T., Improving the Fisher kernel for large-scale image classification. In: ECCV (2010), but other image descriptors can be used. Third, it allows for words, a problem which is generally referred to as zero-shot recognition in the computer vision and machine learning literature. Fourth, the recognition process is very simple and efficient since, as discussed previously, it merely involves a nearest neighbor search.

The approach discussed herein raises two questions. First, what makes an appropriate label embedding? While finding good representations of images is a fundamental problem in computer vision, finding good class representations remains less explored. Second, how to find a transformation to a space where image and label embeddings are comparable? This disclosure answers both questions and makes the following contributions. To answer the first question, word labels are embedded in a Euclidean space as a Spatial Pyramid Of Characters (SPOC). To answer the second question, the mapping between word-image and word-label representations is learned using a Structured SVM (SSVM) framework.

Our goal is to represent images and labels in the same vector space, i.e., to make them comparable using a simple similarity function (such as the dot product). The following paragraphs detail the general model formulation, the specific choices for image and label representations, the objective function, and the optimization algorithm. Finally, we also describe how to leverage the proposed approach for image-to-image comparisons, and a method to deal with wildcard characters in retrieval settings.

Figure 3:
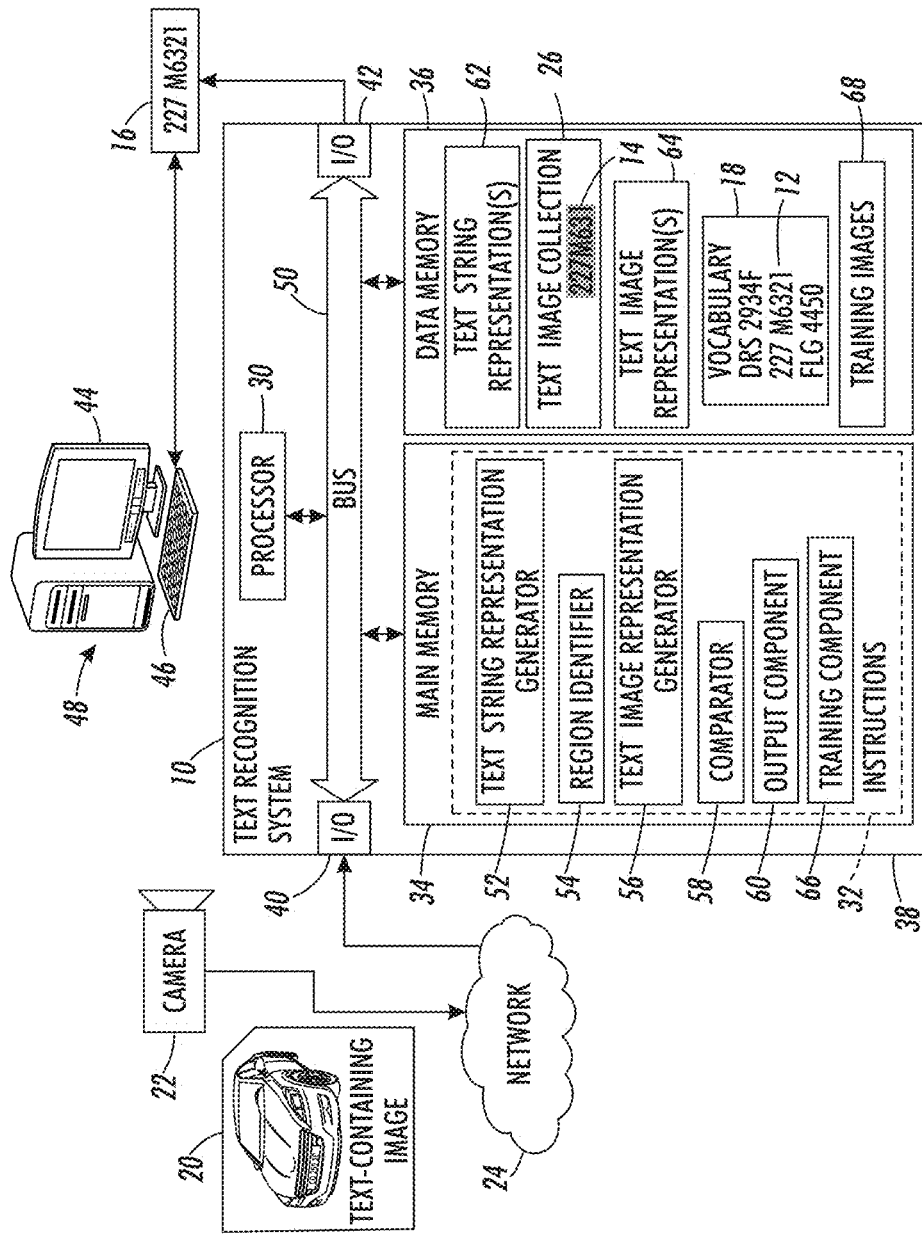
FIG. 3 is a functional block diagram of a system for recognizing text in images.

With reference to FIG. 3, a functional block diagram of a computer-implemented text recognition system 10 is shown. The computer system 10 is configured for computing a measure of similarity between a character string 12 such as a license plate number, and a text image 14, such as an image of a license plate, by generating representations of the respective objects in a space which allows a meaningful measure of similarity to be computed, without the need for OCR or other character recognition processing of the text image, and to output information 16 based thereon. The license plate number (or registration identifier) is a numeric or alphanumeric code that uniquely identifies the vehicle on which it is mounted within the issuing region's database. As will be appreciated, the license plate number and image of a license plate are exemplary only and are used to illustrate the exemplary embodiment in which a text image is compared to a character string of characters drawn from a predefined, finite vocabulary.

Various forms of information 16 may be output based on the computed similarity measure which may depend on the use of the system 10. In one embodiment, a character string 16 that is predicted to correspond to the text image can be output by the system when the similarity measure meets a threshold value. In another embodiment, the most similar character string 16 may be output. In yet another embodiment, the information output may include a notification that the text image does not correspond to one of a limited vocabulary 18 of the character strings 12, for example, if the similarity measure does not meet a threshold value for any of the character strings in the vocabulary 18.

The exemplary system 10 may be configured for receiving as input one or more images 20, which in the illustrated embodiment are images of vehicles acquired by an image capture device 22, such as a camera. In other embodiments, the system 10 may receive as input preprocessed text images 14, formed by localizing the text content in the image 20 and cropping the extraneous content out of the image. The system 10 may be communicatively connected with the image capture device 22 or with one or more intermediate computer-implemented image processing systems (not shown) via a wired or wireless connection 24, such as a local area network or a wide area network, such as the internet. In some embodiments, a collection 26 comprising a number of text containing images 14, such as at least two or at least five or at least ten or a hundred text images 14, may be acquired and stored in memory of the system or in remote memory that is accessible to the system.

In the exemplary embodiment, the system is configured for receiving (or internally generating) the vocabulary 18 of the character strings 12, which may each be referred to herein as a label. The character strings 12 each comprise a sequence of characters drawn from a finite set of characters. Each character can be represented in the form of a binary code, which represents each character of the finite character set as a unique sequence of bits, such as a seven or more bit binary code, depending on the number of characters in the finite set. ASCII codes may be used although codes specifically designed for the system may alternatively be employed. In the license plate example, the vocabulary 18 of predefined character strings may include all possible worldwide or US license plate numbers, US license numbers currently in use, or a more limited set, such as only the license plate numbers of vehicles authorized to park in a designated area, or license plate numbers of stolen vehicles.

Figure 4:
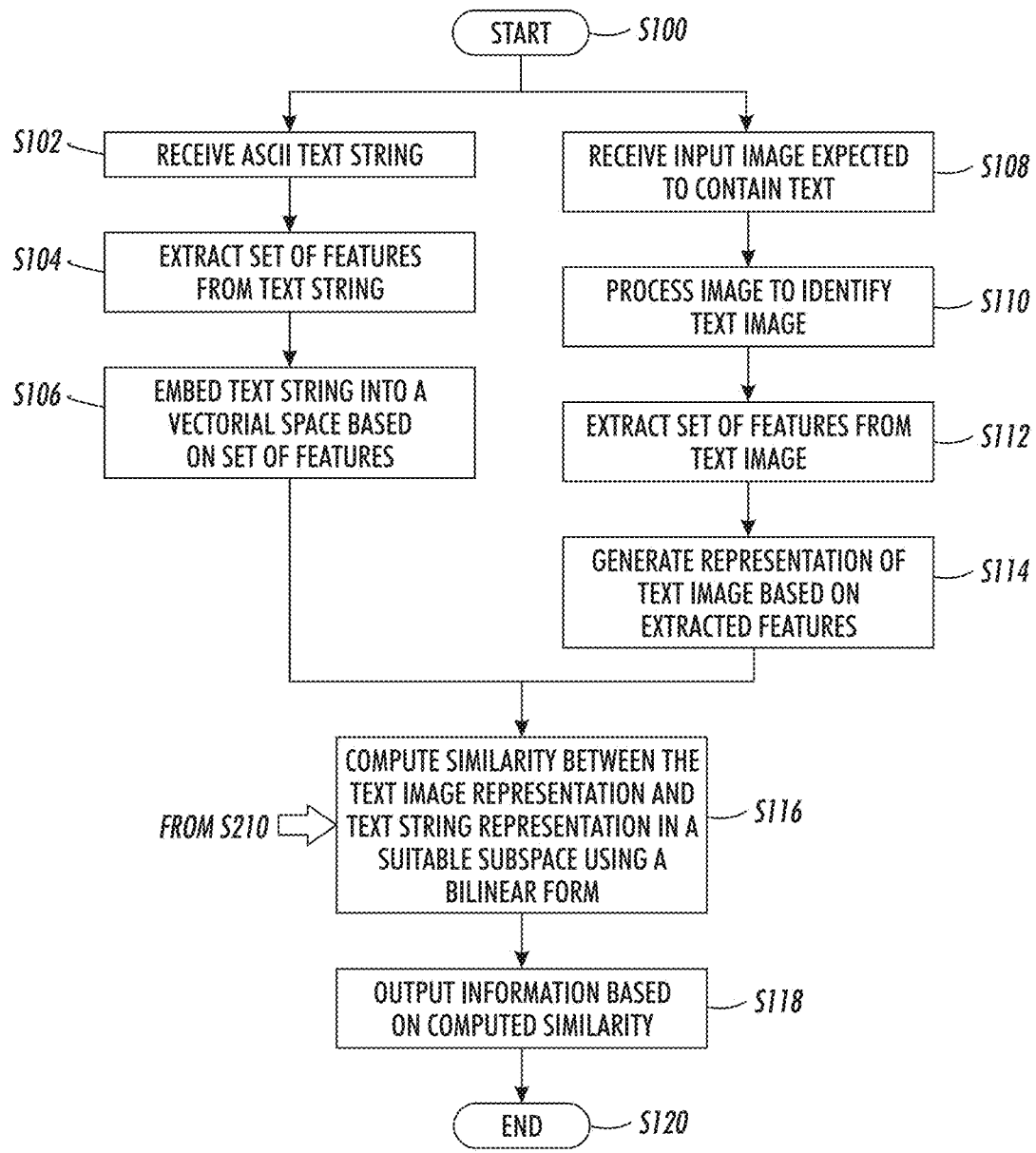
FIG. 4 is a flow chart of a method for recognizing text in images.

The illustrated computer system 10 includes a processor 30 which executes instructions 32 stored in main memory 34 for performing the method outlined in FIG. 4. The processor 30 may also control the overall operation of the computer system 10 by execution of processing instructions stored in memory 34. Data may be stored in data memory 36 that is integral with or separate from memory 34 and which may be resident on the same computing device 38, as shown, or on a remote computing device.

Computer system 10 also includes a network interface 40 and a user input output interface 42. The input/output (I/O) interface 42 may communicate with one or more of a display device 44, such as a computer monitor or other screen, for displaying information to users, and a user input device 46, such as a keyboard or touch or writable screen, and/or a cursor control device, such as mouse, trackball, or the like, for inputting text and for communicating user input information and command selections to the processor 30. Display device 44 and user input device 46 may be directly linked to the computer 38, or may form parts of a client computing device 48 which is linked to the system by a wired or wireless connection analogous to link 24. The various components of the computer 38 may be all communicatively connected by a bus 50. The computer may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 34, 36 may represent any type of non-transitory computer readable medium such as random access memory (RAM), read only memory (ROM), magnetic disk or tape, optical disk, flash memory, or holographic memory. In one embodiment, the memory 34, 36 comprises a combination of random access memory and read only memory. In some embodiments, the processor 30 and memory 34 and/or 36 may be combined in a single chip. The network interface 40, 42 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 30 can be variously embodied, such as by a single-core processor, a dual-core processor (or more generally by a multiple-core processor), a digital processor and cooperating math coprocessor, a digital controller, or the like. The digital processor 30, in addition to controlling the operation of the computer 38, executes instructions stored in memory 34 for performing the method outlined in FIG. 4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 3 is a high level functional block diagram of only a portion of the components which are incorporated into a computer system 10. Since the configuration and operation of programmable computers are well known, they will not be described further.

Images 14, 20 may be received by the text recognition system 10 in any convenient file format, such as JPEG, GIF, JBIG, BMP, TIFF, or the like or other common file format used for images and which may optionally be converted to another suitable format prior to processing. Input images may be stored in data memory 36 during processing. Images 14, 20 can be input from any suitable image source, such as a workstation, database, memory storage device, such as a disk, image capture device, or the like. In general, each input digital image includes image data for an array of pixels forming the image. The images may be individual images, such as photographs, video images, or combined images, or the like. In general each image 14, 20 may be a digital photographs expected to include a text region in which characters of a text string are visible as a set of pixels of the image. The image data of the image may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The exemplary embodiment may be used for black and white (monochrome) images or for images which have been converted to monochrome for convenient processing.

The instructions 38 may include a text string representation generator 52, a region identifier component 54, a text image representation generator 56, a comparator 58, and an information output component 60. These components are best understood with respect to the method described with reference to FIG. 4. Briefly, the text string representation generator 52 operates on the character strings 12 in vocabulary 14 to generate a representation 62 for each in Euclidian space, or at least for a selected subset thereof, using the SPBOC technique, described in further detail below. The region identifier component 54 receives an input image 20, which is expected to contain an image segment containing a text string, and identifies an image segment 14, likely containing a text string, which is stored in memory. The region identifier component 54 is optional if the image segments 14 have been generated elsewhere. The text image representation generator 56 generates a vectorial representation 64 of the image 14, again using the SPBOC technique. The comparator 56 compares the two representations, optionally after embedding one or both of them in a common subspace, to generate a measure of comparability, such as a similarity score. The information output component 60 outputs information based thereon, such as whether the image segment 14 and the vocabulary text string 12 are a match, the most likely match from the vocabulary 18, or in a reverse matching problem given a single vocabulary text string 12, outputs the most likely match in a database containing a collection of the image segments, or information based thereon. The system 10 may include a training component 66 for learning parameters of an embedding function used by the comparator 56. Alternatively, the embedding function may be learned by a separate system.

FIG. 4 illustrates a method for text recognition which can be performed with the system of FIG. 3. The method begins at S100.

At S102 at least one character string 12 (or "label") for which a representation is to be generated is received and stored in memory 36.

At S104, for each character string 12, a representation is generated by the text string representation generator 52, and stored in memory. There may be a single text string or a plurality of text strings in the vocabulary 18, depending on the specific application. The character strings 12 that are in the vocabulary 18 may vary over time in some embodiments.

At S106, for each character string 12 in the vocabulary 14, features are extracted using the SPBOC. In particular, the character string is recursively partitioned into regions and for each region, features are extracted based on the characters wholly or partially present in the region.

At S108, a vectorial representation 62 is generated for the character string 12, based on the features extracted at S106, and stored in memory 36.

At S110, at least one input image 20 which is expected to contain an image segment containing a text string is received and stored in memory 36. The method may take as input a single image 20, or a collection 26 of images to be processed. The images 14 in the collection 26 may vary over time in some embodiments.

Optionally, at S112, for each image 20 an image segment 14 (region of interest), likely containing a text string, is identified within the input image 20, by the region identifier component 54, and stored in memory.

At S114, features are extracted from the image segment 14.

At S116, a vectorial representation 64 of the image segment 14 is generated, based on the features extracted at S114, by the text image representation generator 56.

At S116, the two multidimensional representations 62, 64 are compared by the comparator 58 to generate a comparison measure, such as a similarity score. The comparison may be made in a common subspace by embedding one or both of the two representations in the subspace. In one embodiment, the parameters of an embedding function, such as elements of a matrix, may have been learned using actual labels of labeled test images to provide a comparison measure that is more likely to yield a more accurate measure of similarity for the label and image, as described with reference to FIG. 5. The embedding and comparison of the embedded representations can be performed in a single step with a single embedding/comparison function which takes as input the two representations 62, 64, as described below. In other embodiments, the embedding and comparison of the embedded representations can be performed as separate steps. The comparison can include determining whether the two representations exceed a threshold on similarity from which they are determined to be a match or a potential match.

At S118, information based on the comparison is output by the output component 60. In the case where the method is used for recognition, e.g., to find a match for a given text image, such as a license plate image, in a database 18 of text strings 12, such as license plate numbers, the information output may be a closest matching one (or more) of the license plate numbers from the database, if the comparison score is above a predetermined threshold or information based thereon, such as information about the owner of the vehicle. In the case where the method is used for retrieval, e.g., to find a match for a given input text string, such as a license plate number, in a database of text images, such as license plate images, the information output may be a closest matching one (or more) of the license plate images from the database, if the comparison score is above a predetermined threshold, or information based thereon, such as information about the location of the vehicle at a given time, for example the location of the camera which captured the license plate image, or that there is a vehicle in a location, such as a parking garage with a license plate which matches the text string.

The method ends at S120. The method can return to one of the earlier stages when a new image or new character string is received.

Figure 5:
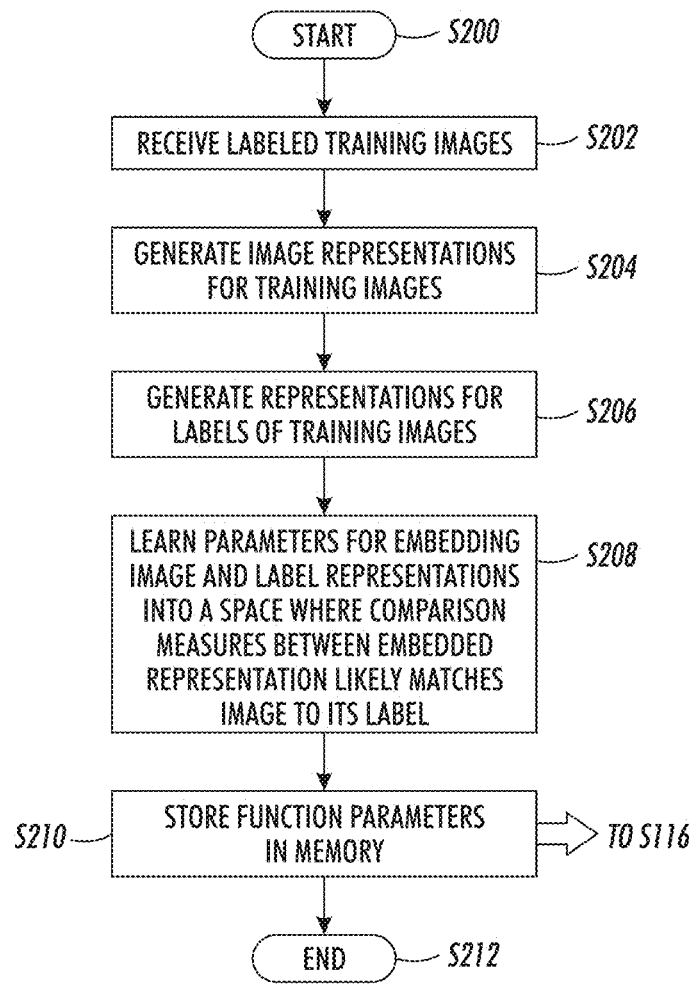
FIG. 5 is a flow chart illustrating computing parameters of a function for comparing image and text representations for use in the system of FIG. 1.

The method of FIG. 4 assumes that a comparison function has been learned for comparing the two representations. FIG. 5 illustrates an example method for learning the comparison function, which is described more fully below. The method may be implemented by the training component 66 of the system 10, which calls on other components previously described, or may be performed on a separate computing device.

The method begins at S200.

At S202 a set 68 of training images, similar to images 14, is received. Each training image has a manually assigned label which is the character string that a human reviewer has recognized in the image, such as the sequence of letters and numbers forming a license plate number. The character string (label) consists of a sequence of characters selected from the finite set of characters.

At S204, an image representation is generated for each training image with image representation generator 56, in the same manner as for the test image 14, e.g., using Fisher vectors, as described for S104, S106.

At S206, a representation is generated for each label, with text string representation generator 52, as described for S112, S114.

At S208 embedding parameters, such as weights of a matrix, are learned for embedding one or both of the image and text string representations in a space in which the image representation is more likely to be most similar to its corresponding label representation than to other label representations, or vice versa. This ensures that matching image/label pairs rank higher than non-matching pairs. The matrix of weights w can be learned using stochastic gradient descent, or other learning methods. At S210, the learned parameters are stored in memory, such as memory 36. The method ends at S212 and/or may proceed to S116 of FIG. 4.

The method illustrated in FIG. 4 and/or FIG. 5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 4 and/or 5, can be used to implement the method.

As will be appreciated, the steps of the method(s) need not all proceed in the order illustrated and fewer, more, or different steps may be performed.

Further details of the system and method will now be described.

The exemplary method can use a principled solution to the problem of text recognition in images which is based on structured output learning. See, for example, I. Tsochantaridis, et al., "Large margin methods for structured and interdependent output variables," JMLR, 2005, for a discussion of this approach.

Briefly, candidate text labels 12 are embedded in a Euclidean space by computing an explicit representation of the label: a spatial pyramid bag-of-characters (SPBOC) (S104, S106). In the comparison stage (S116), a ranking objective function is optimized, which ensures that matching feature/label pairs rank higher than non-matching pairs. Given a test image 14, text recognition can be performed by searching for the best ranked label among a set of candidate labels. In one embodiment, the objective function performs an embedding of the image representations into the space of the label representations. This allows expressing the similarity of an image and a label as a dot product between the image and label representations.

Comparing a Character String with an Image Representation

For recognition purposes, the problem is to recognize words in a given vocabulary Y. This vocabulary may be the natural vocabulary of a natural language such as English. In the license plate recognition context, this could be the set of valid license plate numbers to be recognized. It is also assumed that access is provided to images 14 of the words to be recognized. In the example embodiment, each image 14 contains a sequence of characters, such as single word, as obtained, for example, after the segmentation process (S110). In the case of license plates, for example, segmentation processes have been developed which identify the most likely region of an image 20 where the license plate is to be found by comparing the image 20 with images which have been previously segmented in this way. See, for example, above-mentioned U.S. application Ser. No. 13/351,038. Other segmentation algorithms suited to license plate images are described in Anagnostopoulos, discussed above. In other embodiments, a manual segmentation may be performed in which a human reviewer identifies the region of an image in which the license plate is located.

Let X be the space of word images. Then, given an image 14, the aim is to predict the likely sequence of characters that it contains. In the exemplary embodiment, a structured prediction model referred to herein as a compatibility function, is learned which is applied by the comparator 58. The function can be learned prior to input of an image 14, in a preliminary step, as follows.

Structured Prediction

As discussed briefly with reference to FIG. 5, the goal of prediction is to learn a function of the general form:

$$f: X \to Y \qquad (1)$$

i.e., a function which converts the space X of word images to the vocabulary Y. In structured prediction, this may be performed as follows. A function: $F: X \times Y \to \mathbb{R}$, is introduced where $\mathbb{R}$ is the set of real numbers. Then, a function can be defined for an image x as follows:

$$f(x; w) = \operatorname*{argmax}_{y \in Y} F(x, y; w) \qquad (2)$$

where w denotes a parameter vector of the function F, and y represents one of the labels in the vocabulary Y, i.e., given an image x, the aim is to find a label y which maximizes the function F over the set Y of all possible labels.

F(x,y; w) can be understood as a compatibility function which measures how compatible the pair (x,y) is, given the parameters w.

It can be assumed that F is linear in some combined feature embedding $\psi(x,y)$ of image samples and labels, i.e.:

$$F(x,y;w) = \langle w, \psi(x,y) \rangle \qquad (3)$$

where $\langle ., . \rangle$ denotes the dot-product operator. The joint embedding $\psi$ can be written as the tensor product between an embedding of the images: $\theta: X \to \mathbb{R}^D$ and an embedding of the labels $\phi: Y \to \mathbb{R}^E$, where D and E represent the dimensionality of the respective representations and $\theta$ represents the features of an image, i.e.:

$$\psi(x,y) = \theta \otimes \phi(y) \qquad (4)$$

where $\otimes$ represents the tensor product, $\theta(x)$ represents the feature vector (representation) of a given image x, $\phi(y)$ represents the feature vector representing a given label (character string) y and $\psi(x,y): \mathbb{R}^D = \mathbb{R}^E \to \mathbb{R}^{DE}$. In such a case, the embedding parameter w is a DE-dimensional vector, which can be reshaped into a D×E matrix W. Consequently, a compatibility F(x,y; w) can be rewritten as a compatibility function in a bilinear form:

$$F(x,y;W) = \theta(x)^T W \phi(y) \qquad (5)$$

where T represents the transpose operator. Thus, given a representation of an image and a representation of a character string, a compatibility F between the image and the label is computed by multiplying the feature vectors representing the image and label features when embedded into a new space using the projection matrix W. W essentially provides a weight for each pair of features, one from the image representation and one from the character string representation. As will be appreciated, in Eqn. 5 the positions of the two representations $\theta(x)$ and $\phi(y)$ may be swapped.

It may be noted that if the number of elements D and E in the two vectors are large, then the matrix W may be large, in which case it may be advantageous to consider a low-rank decomposition of W as a product of two matrices. In this case an approximation $W \approx U^T V$ is used, with $\in \mathbb{R}^{R \times D}$, $V \in \mathbb{R}^{R \times E}$, where R<D and R<E. In such a case:

$$F(x,y;W) = (U\theta(x))^T (V\phi(y)) \qquad (6)$$

Thus, F(x,y; W) is a dot-product in an R-dimensional space. In what follows, only the full-rank case (Eqn. 5) is considered with the understanding that a decomposition as in Eqn. 6 is readily performed. In the next two sections, the choice of functions $\theta$ and $\phi$, for embedding each image and each label, respectively, is discussed.

Image Embedding (S112, S114)

An image representation or "signature" 64 is generated from each cropped image 14 based on low level features extracted from the image, such as color or gradient features, and analogously for the training images. The function $\theta: X \to \mathbb{R}^D$ is a feature extraction function which takes as input an image 14 in a space X (an array of pixel values) and outputs a D-dimensional vectorial image signature. While any feature extraction method can be used, as discussed below, in the exemplary embodiment, a bag-of-patches framework is used. In this method, low-level features are extracted from local patches at multiple scales and statistics computed for each patch descriptor. These patch statistics are then aggregated at an image level. The patch statistics can be computed, for example, using the Fisher Vector (FV) principle: it is assumed that a generative model of patches exists (such as a Gaussian Mixture Model (GMM)) and the gradient of the log-likelihood of the descriptor is measured with respect to the parameters of the model. To include spatial information about the word image into the signature, the image can be partitioned into regions, the per-patch statistics aggregated at a region level, and then the region-level signatures concatenated to form the image signature. See, for example, S. Lazebnik, et al., "Beyond bags of features: Spatial pyramid matching for recognizing natural scene categories," CVPR '06 Proc. 2006 IEEE Computer Society Conf. on Computer Vision and Pattern Recognition—Volume 2, Pages 2169-2178.

While particular reference is made to Fisher vectors, other methods for computing an image signature are also contemplated The signature 64 generated by representation generator 56 for each image 14 can be any suitable high level statistical representation of the respective image, such as a multidimensional vector generated based on features extracted from the image. Fisher Kernel representations and Bag-of-Visual-Word representations are exemplary of suitable high-level statistical representations which can be used herein as an image signature. The exemplary image signatures are of a fixed dimensionality, i.e., each image signature has the same number of elements. In general, each image signature 64 has at least 30, or at least 60, or at least 100, or at least 500 dimensions, and up to 1000 or more dimensions, each dimension having a respective feature value, which may be reduced to fewer dimensions.

In one embodiment, the representation generator 56 includes a patch extractor, which extracts and analyzes low level visual features of patches of the image 14, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. For example, at least 10 or at least 20 or at least 50 patches are extracted from each image. Each patch may comprise at least 40 or at least 100 pixels, and up to 1,000,000 pixels or more.

The extracted low level features (e.g., in the form of a local descriptor, such as a vector or histogram) from each patch can be concatenated and optionally reduced in dimensionality, to form a feature vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed, as in the case of the Fisher vector described above. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, or features of characters, such as straight lines, curved lines, etc.), characteristic background (e.g., starlit sky, blue sky, grass field, snow, beach, white surface, etc.), or the like. Given an image 14 to be assigned a signature, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image signature or input to a generative model which outputs an image signature based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

The signatures may be indexed or compressed using conventional techniques (locality sensitive hashing (LSH), product quantization, principal component analysis (PCA), etc.) to speed up the process.

In the case of a Fisher vector, this can be computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., U.S. Pub. No. 20120045134, published Feb. 23, 2012, entitled LARGE SCALE IMAGE CLASSIFICATION, by Florent Perronnin, et al., F. Perronnin, et al., "Improving the Fisher kernel for large-scale image classification," in ECCV, Part IV, pages 143-156 (2010), and in Jorge Sanchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any license plate image if the range of interest is license plates).

Other exemplary methods for computing image signatures are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739.

While the exemplary method considers license plate or other images in which the sequence of characters forms a single row, it is also the case that character strings may be split over two or more rows. In One embodiment, such an image may be segmented into rows and the rows concatenated to firm a single row image. In other embodiments, an image is segmented into words and each word is considered as a separate sequence of characters.

Text Embedding (S104-S106)

The function φ is used to embed character strings, such as words in a binary code e.g., ASCII words (or UTF-8), into a Euclidean space. This embedding is intended to respect some similarity between words, such that two similar words are close to each other in the Euclidean space after embedding. There are several ways to measure the similarity between two words (lexical vs. semantic) and some of them are less well suited to the case of text recognition. In the present case, it is appropriate to preserve the lexical similarity, this means that words which contain the same letters in the same order should be closer to each other after the embedding. For example, a pair of words such as "mommy" and "mummy" should be closer to each other than a pair of words such as "mummy"' and "mother". One suitable embedding technique which preserves the lexical similarity will now be described.

It is assumed that the words in the images 14 are composed of characters in a finite set of characters. For example, for a license plate recognition method, the set of possible characters $\mathcal{L}$ is the set of possible letters and figures in the alphabet A={A, B, C, D, . . . Z}∪{0, 1, 2, 3, 4, 5, 6, 7, 8, 9, 0}. In this embodiment, A=26+10=36 characters. As will be appreciated, other characters may be considered depending on the application or the target language. Special characters may also be considered such as a space amounting to at least a predefined gap between two characters.

The words could simply be embedded into an |A|-dimensional space (where |A| denotes the cardinality of the set) by counting the number of occurrences of each character. Such a representation would correspond to a bag-of-characters (BOC). Such a histogram representation could then subsequently normalized, using, for example the $\ell_1$ norm or the $\ell_2$ norm (or any $\ell_p$ normalization technique). Other normalizations can also be applied, such as a square-rooting which is beneficial on histogram representations when measures such as the dot-product or Euclidean distance are subsequently used (see, for example, F. Perronnin, J. Sánchez, and Y. Liu, "Large-scale image categorization with explicit data embedding," in CVPR, 2010). As a simplified example, assume that the set of characters includes only 5 characters, e.g., A={A, B, C, D, E}. Assume also that the following 5-character word is being considered: ABCDE. In such a case, each of the five possible letters occurs only once, so without normalization, the histogram of counts for each of the possible characters would be [1, 1, 1, 1, 1]. Assuming that an $\ell_1$ normalization of the histogram is performed (i.e., all elements sum to 1), then the BOC representation, which ignores character order, is: [1/5, 1/5, 1/5, 1/5, 1/5].

A disadvantage of the BOC representation described above is that it does not take into account the order of the letters. Therefore, the sequence EDCBA would have the same BOC representation as ABCDE, although the letters are in reverse order.

Figure 6:
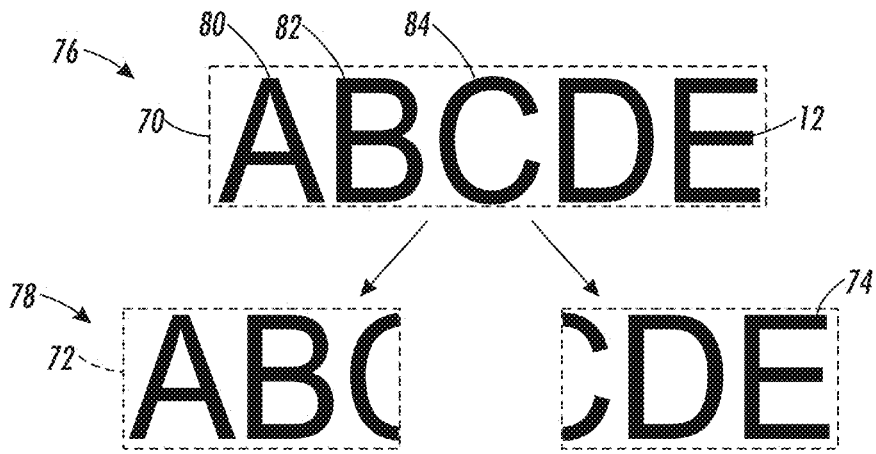
FIG. 6 illustrates generating regions of a character string in the methods of FIGS. 2 and 3.

To include information about the order of characters, in the exemplary embodiment, a spatial pyramid representation (SPBOC) may be employed, rather than a simple BOC. In this method, a word (such as the letters ABCDE in FIG. 6 is partitioned into a plurality of regions 70, 72, 74 (the entire character string can be considered one region 72). In one embodiment, this results in a sequence of spatial levels 76, 78, etc., each level (apart from the first) being formed by partitioning the region(s) in the previous (higher) level. The partitioning is performed perpendicular to the direction of the text. Thus, in at least the second level 78, each region 72, 74 includes at least one full character. Each character 80, 82, 84, etc. in the character string may be assumed to have a character width, which can be the same for each character, if the same is expected to be approximately true for the characters in the word images. In this embodiment, this results in a five character string being split equally into two 2½ Character Strings at the Second Level and into Four 1¼ character strings at the third level. In other embodiments, different characters may be assigned different widths.

The number of characters 70, 72, 74 in each region is then counted. If a character falls into multiple regions, then the assignment of this letter to this region is proportional to the percentage of the character which falls into the region. For example the letter C is split equally between regions 72 and 74 and thus each of regions 72 and 74 is assigned ½ C. A word 12 (or other character string) may be split recursively into two, where different partitions correspond to different levels. At each level, one BOC is computed for each region. The BOC may be a vector having an element for each character in the set of characters each element having a value which is based on the number of occurrences of that character in the respective region. For example, the counts are normalized so that the elements of the vector sum to 1.

Then, the BOC representations corresponding to each region and each level are concatenated. This representation is referred to herein as a Spatial Pyramid BOC (SPBOC).

Figure 7:
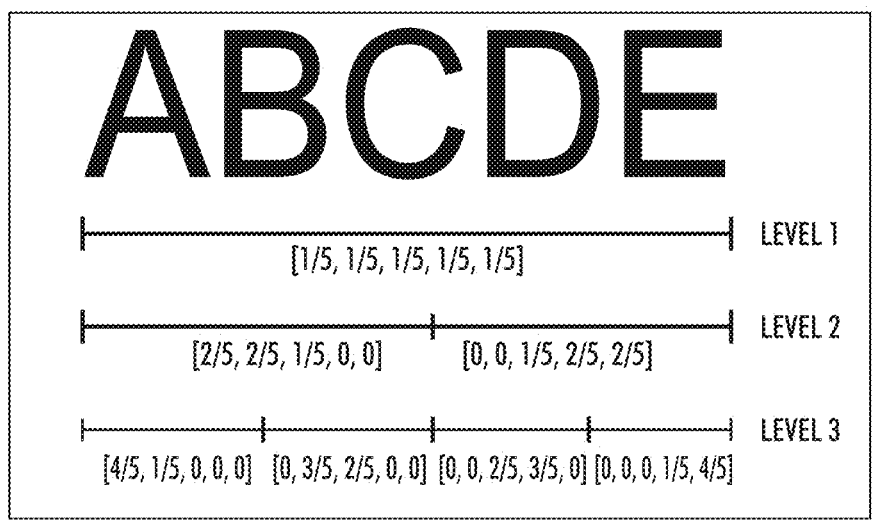
FIG. 7 illustrates an example of Spatial Pyramid Bag-of-Characters (SPBOC) Embedding.
Figure 8:
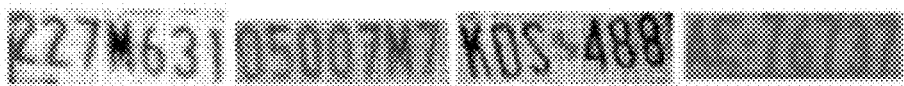
FIG. 8 shows examples of license plate images used in the Examples.

FIG. 7 illustrates how this may proceed for the word ABCDE in the illustration. At the first level (where there is no partitioning), a normalized BOC for the partition is as for the BOC example above, i.e., the bag of characters includes an equal weight for each of characters ABCDE. As for the BOC example, it is assumed, for ease of illustration, that the alphabet consists only of the letters A, B, C, D, and E. In practice, in the license plate example, a larger character set of, for example, 36 characters is considered, so the representations for each level would include elements which correspond to 0/36 where that character is absent from the character string 12. At the second level, where two regions are considered, the first region 72 encompasses letters A and B and half of letter C, which corresponds to [1/5, 1/5, 0.5/5, 0/5, 0/5] so the $\ell_1$ normalized BOC for this region is [2/5, 2/5, 1/5, 0/5, 0/5], i.e., normalization is such that all values in the representation of a region sum to 1. Going down to the next level, the first of four regions corresponds to letter A and ¼ of letter B, so the −$\ell_1$ normalized BOC for this region is [4/5, 1/5, 0/5, 0/5, 0/5]. The SPBOC is then generated by concatenating all of the normalized region BOCs for each of the levels, giving a 35 dimensional vectorial representation in this case. In this embodiment, each level is given the same weight. In other embodiments, the BOCs may be weighted or otherwise aggregated to generate the SPBOC.

The number of levels is not limited to the three illustrated and may be dependent on the expected number of characters in a word for example there may be at least 2 levels in one embodiment and at least 3 or at least 4 levels in another embodiment (the entire character string being the first level). In one embodiment, the number of regions in the lowest level is no greater than the average (or maximum) number of characters (including spaces in the character strings. In one embodiment, 5 levels may be employed, and this may generate up to 32×(1+2+4+8+16)=1,116-dimensional SPBOC representations, where 32 characters are considered. The histogram representations are $\ell_1$-normalized. An advantage of this representation is that it is typically sparse and therefore can be stored in an efficient manner.

While in the exemplary embodiment, at each level, the previous regions are each partitioned into two smaller regions, other partitioning methods could be employed, such as a SPBOC formed by partitioning one region into 3, 4 or more regions at the next level. Additionally, the partitioning could be different for different levels, for example to form level 3, level 1 could be partitioned into three regions. In each case, however, the partitioning results in a higher level (fewer regions) being partitioned to form a greater number of regions.

As will be appreciated, other techniques may be employed to embed ASCII words into a Euclidean space. As an example, an unsupervised learning method may be employed. Given a vocabulary Y, the similarity between two sequences of letters could be measured using the string kernel and kernel PCA could be employed for the actual embedding. See, for example, B. Schölkopf, A. Smola, and K.-R. Müller, "Non-linear component analysis as a kernel eigenvalue problem," Neural Computation, Jul. 1, 1998, Vol. 10, No. 5, pp. 1299-1319, for further details on kernel PCA. A potential disadvantage of this approach is that embedding a new unseen word (in the case where the vocabulary Y is to be enriched) is potentially costly. For example, using the Nyström approximation would require computing the string kernel between the new word and each element in Y (see, for example C. Williams and M. Seeger, "Using the Nyström method to speed up kernel machines," NIPS, 2001). In contrast, the exemplary SPBOC representation enables new words to be added easily and embedded on-the-fly.

Learning Objective Function

To learn the parameters w, of the embedding function a labeled training set is employed: $S=\{(x_n,y_n), n=1, \ldots, N\}$, as described in FIG. 5. w can be a vector comprising a value for each pair of elements of the image and text representations, which can alternatively be expressed as a matrix W. For example a set 68 of N labeled training images is provided, such as license plate images, where N may be for example, at least 20 or at least 100. Each image may have been manually annotated with a label corresponding to the character string seen in the training image. Image representations are generated (S204) for these images. In structured learning, the goal is to minimize, with respect to the vector w, over all the training samples, an objective function of the form:

$$R(S; w) = \frac{1}{N} \sum_{n=1}^{N} \Delta(y_n, f(x_n)) + \frac{\lambda}{2} \|w\|^2. \quad (7)$$

Eqn. (7) expresses the fact that there is a distortion between the true label and the label predicted by the algorithm. The first term is an empirical loss where each term $\Delta(y_n, f(x_n))$ quantifies the loss of choosing the label $f(x_n)$ when the true label was $y_n$. The second term is a regularization term which penalizes larger values of w. The parameter $\lambda$, which may be determined through cross-validation, sets a balance between these two terms.

Different loss functions $\Delta$ may be used. The simplest one is the 0/1 loss: if the label is the correct one, the value for the term is 0 and if it is incorrect, the value of the term is greater than 0, e.g., 1, i.e. $\Delta(y_i,\hat{y}_i)=0$ if $y_i=\hat{y}_i$ and 1 otherwise. In another embodiment, if the SPBOC is $\ell_1$-normalized, then the label embeddings (text representations) can be viewed as multinomial distributions, in which case, it make sense to use, as the loss $\Delta$, a distance between probability distributions. Common distances between distributions include the Hellinger distance, the $\chi^2$ distance, and the Manhattan distance. For two text representations that are E-dimensional multinomials a and b, then the loss term can be any one of, or a combination of:

$$Hellinger(a, b) = \sum_{e=1}^{E} (\sqrt{a_e} - \sqrt{b_e})^2 \quad (8)$$

$$\chi^2(a, b) = 1 - 2\sum_{e=1}^{E} a_e b_e/(a_e + b_e) \quad (9)$$

$$Manhattan(a, b) = \sum_{e=1}^{E} |a_e - b_e|. \quad (10)$$

It may be noted that the Hellinger distance is simply the Euclidean distance on the square-rooted multinomials. In the example experiments below, the simple 0/1 loss was used to compute the loss term.

Since the objective function R (Eqn. 7) is difficult to optimize directly, one option is to optimize a convex surrogate instead. In structured support vector machines (SSVM), this can be achieved by choosing, as a convex upper-bound on $\Delta(y_n, f(x_n))$, the following loss which generalizes the hinge loss to multiple outputs:

$$B_1(y_n, f(x_n)) = \max_{y \in Y} \Delta(y_n, y) - F(x_n, y_n; w) + F(x_n, y; w). \quad (11)$$

This extension is generally referred to as the margin-rescaled hinge loss. An alternative upper-bound is the slack-rescaled hinge loss:

$$\max_{y \in Y} \Delta(y_n, y)(1 - F(x_n, y_n; w) + F(x_n, y; w)). \quad (12)$$

Note that in the 0/1 loss case, both Eqn. 11 and 12 are equivalent. See S. Nowozin and C. Lampert, "Structured learning and prediction in computer vision," Foundations and Trends in Computer Graphics and Vision, 2011. Vol. 6, Nos. 3-4, at p. 120.

A disadvantage of the upper-bound in Eqn. 11 is that it includes a $\max_y$ operation. This has two negative effects: i) the objective is typically non-smooth and ii) training can be slow when the cardinality of Y is large, even with techniques such as Stochastic Gradient Descent (SGD). See, Y. LeCun, L. Bottou, G. Orr, and K. Muller, "Efficient backprop," in G. Orr and M. K., Eds., Neural Networks: Tricks of the trade. Springer, 1998. Therefore, as an alternative, the method can resort to using convex upper-bounds which are not as tight but which are smoother. For example, the following upper bound is used:

$$B_2(y_n, f(x_n)) = \qquad (13)$$
$$\sum_{y \in Y} \Delta(y_n, y) - F(x_n, y_n; w) + F(x_n, y; w) \geq B_1(y_n, f(x_n))$$

This is a further bound on Eqn. 11. The first term is the error $\Delta$ between the label and the true label for each sequence of characters $y_n$ from the set of possible sequences Y and can be the 0,1 loss (0 if the same, 1 if different) or other computed loss. n goes over all training examples. The second term measures the similarity between image of nth example and the true label $y_n$ and the third term is the computed similarity between the image and a randomly sampled label y. The aim is to reward the cases when an image and its matching sequence give a higher similarity (under the current set of parameters w) than the image and a non-matching sequence.

This is similar to the ranking SVM proposed by Joachims (see, T. Joachims, "Optimizing search engines using click-through data," Proc. 8th ACM SIGKDD international conference on Knowledge discovery and data mining, pp. 133-142, 2002). Indeed, in the case of the 0/1 loss, $B_2$ can be shown to be an upper-bound on the rank of the correct label $y_n$. This formulation is referred to herein as Ranking Structured Support Vector Machine (RSSVM).

Optimization

In one embodiment, Stochastic Gradient Descent (SGD) is employed for optimization of the parameter of the embedding function. In the case of the formulation of the optimization in $B_1$, the aim is to seek W such that:

$$w^* = \operatorname*{argmin}_{w} \frac{1}{N} \sum_{n=1}^{N} B_1(x_n, f(y_n)) + \frac{\lambda}{2}\|w\|^2 \quad (14)$$

The learning procedure can be performed as follows.
At time t:
1. Randomly sample a pair comprising an image and its label $(x_n, y_n)$ from the training set.
2. Find the label from the set of labels which maximizes, over the set of labels the function:

$\hat{y}_n = \arg\max_{y \in Y} \Delta(y_n, y) + F(x_n, y; w)$.

3. Update the weights based on a step size and:

$w \leftarrow (1-\eta_t \lambda)w + \eta_t[\psi(x_n, y_n) - \psi(x_n, \hat{y}_n)]$.

where $\eta_t$ is the step size (learning rate) at time t. In what follows, $\eta_t = \eta$, i.e., the step size is fixed. In another embodiment, the step size decreases with time (number of samples), to decrease the amount of correction as the weights are progressively learned. A disadvantage of this algorithm is that it requires a max at step 2. As noted earlier, this can be very costly when the cardinality of $\psi$ is high.

In the case of $B_2$, the aim is to seek w* such that:

$$w^* = \operatorname*{argmin}_{w} \frac{1}{N} \sum_{n=1}^{N} B_2(x_n, f(y_n)) + \frac{\lambda}{2}\|w\|^2 \quad (15)$$

The learning procedure can be as follows. At step t:
1. Randomly sample a training image and its label $(x_n, y_n)$.
2. Randomly sample a label from the set of labels which is not the correct label:

$y \in Y - y_n$.

3. Update:

$w \leftarrow (1-\eta_t \lambda)w + \eta_t[\psi(x_n, y_n) - \psi(x_n, y)]$

While optimizing this objective function requires a much larger number of iterations, each iteration is less costly and the whole convergence is typically much faster. In the exemplary embodiment, the formulation of Eqn. (15) is therefore optimized with this learning algorithm. The regularization parameter $\lambda$, in either case, can be 0 or greater, typically a small value, such as up to $10^{-5}$ or $10^{-7}$. In the Examples following $\lambda=0$ was found to work well.

For the initialization of weights w, the parameters of the matrix may be randomly sampled from a normal distribution, e.g., divided by the dimensionality of the image feature vectors.

Now is described a method and system to perform text-to-image queries with wild cards, within the framework of label embedding as described RODRIGUEZ et al., "LABEL-EMBEDDING FOR TEXT RECOGNITION", in BMVC, 2013, pages 1-11 and further described above. This framework allows the learning and embedding of images and text descriptors into a common space, in such a way that the matching score between an image, e.g. of a license plate, and a string, e.g. the license plate number, can be computed as a simple distance in the common space, as previously described.

The exemplary embodiment now described extends the label embedding framework to accommodate wildcards both at test time and at training time. Here, test refers to performing a query with a learned embedding, and training refers to learning the embedding. See RODRIGUEZ et al., "LABEL-EMBEDDING FOR TEXT RECOGNITION", in BMVC, 2013, pages 1-11.

Wildcards at Test Time

The similarity function between query strings and images previously described is adapted to include wildcards only at test time, according to one of several approaches:

Ignore the wildcard. The wildcard symbols are simply not taken into consideration when computing the similarity between the text string and the image.

Marginalize over all possible symbols. When a query string contains a wildcard, the contribution of the wildcard to the similarity is split among all possible symbols.

Maximize over all possible symbols: compute the similarity between the image and all the strings matching the wildcard expression, and take the highest similarity.

These approaches are not limited to only one wildcard. However, in the case of maximizing the scores, two wildcards or more leads to an exponential number of comparisons, which makes it unpractical.

Wildcards at Training Time.

The use of wildcards is not restricted only to test time. Indeed, training with wildcards is beneficial if the goal is to test with wildcards. Provided are three different approaches to integrate wildcards into the learning framework:

Ignore wildcards at training time.

Marginalize over wildcards at training time.

Explicitly use a wildcard symbol in the encoding of the strings.

Interestingly, the approach used at testing time does not necessarily need to be the same approach used at test time, e.g., it is possible to learn using an explicit wildcard symbol and test using a marginalization approach. Further details of the method and system of performing text-to-image queries with wildcards is provided below.

Following RODRIGUEZ et al., "LABEL-EMBEDDING FOR TEXT RECOGNITION", in BMVC, 2013, pages 1-11, let us denote by $y \in Y$ a label from a lexicon Y, and with $x \in X$ an image from a set X. Let us denote by $\phi A: Y \to R^d$ an embedding function that embeds labels into a real space of dimensionality d using an alphabet A, and let us denote by $\Theta: X \to R^D$ an embedding function that embeds images into a real space of dimensionality D. Then, the similarity between a label y and an image x is defined as a bilinear function $s(y,x) = \phi_A(y)^T W \Theta(x)$, where W is learned on a labeled train set using a structured SVM framework. The process is illustrated in FIG. 2.

In practice, the FV representation is used for the embedding function $\Theta$, and the spatial pyramid of characters (SPOC) is used as the embedding function $\phi_A$. The SPOC is a histogram that counts how many times the characters of the alphabet A appear in different spatial regions of the label y. If the label y contains characters not included in A, these are ignored. However, the space they take is taken into consideration when computing the position of the other characters. An alphabet consisting of the symbols {0-9,A-Z} is used and it is assumed that the labels y are always uppercase.

Now described is how to modify the approach to deal with queries with wildcards. Initially, the focus is a scenario where wildcards appear only at test time. Then the problem of learning an improved matrix W by artificially introducing wildcards at training time is considered.

Wildcards Only at Test Time.

Let us denote by $\bar{y}$ a query where at least one of its characters is a wildcard. Let us also denote with $G_A$ a generator function that, given $\bar{y}$, generates a set of all possible labels that are a match for $\bar{y}$ under vocabulary A. The wildcards can be handled in the following ways.

Ignore the wildcard. The similarity $S_{ign}(\bar{y},x)$ between the query $\bar{y}$ and the image x is:

$$S_{ign}(\bar{y},x)=s(\bar{y},x)=\phi_A(\bar{y})^T W\Theta(x) \quad (16)$$

Since the wildcard symbol is not in the vocabulary, $A, \phi_A(y)$ will not consider the wildcard when computing the SPOC histogram. However, since the position of the wildcard is taken into account when computing the position of other characters, some implicit information is encoded.

Marginalize over all possible values of the alphabet A. Marginalization can be done "early", by constructing a string representation that includes all possible symbols in that position (weighted by the size of the symbols' alphabet), or "late", by explicitly generating a new set of queries that match the query with the wildcard and averaging the similarities of those queries with the image. This is equivalent to generating the new set of queries, averaging them, and then computing the similarity between that average query and the image. The subtle differences between "early" and "late" marginalization are only due to the way the string representation is normalized. Further described is late marginalization since it obtained slightly better results than early marginalization. The similarity $S_{mrg}(\bar{y},x)$ between the query $\bar{y}$ and the image x is:

$$S_{mrg}(\bar{y}, x) = \frac{1}{|\mathcal{G}A(\bar{y})|} \Sigma_{y \in \mathcal{G}_A(\bar{y})} s(y, x). \quad (17)$$

where $|\mathcal{G}_A(\bar{y})|$ denotes the number of elements of the set $\mathcal{G}_A(\bar{y})$. This approach considers all possible values in the alphabet for the wildcard, and marginalizes over it. Note that computing the similarity $\phi(y)^T W_\Theta(x)$ is more costly than computing the set $\mathcal{G}_A(\bar{y})$, and it is possible to compute this similarity efficiently by constructing an average embedding for the label, i.e.:

$$S_{mrg}(\bar{y}, x) = \left(\frac{\Sigma_{y \in \mathcal{G}A(\bar{y})} Y}{|\mathcal{G}A(y)|}\right)^T W\Theta(x). \quad (18)$$

Maximize over all possible values of the alphabet A. The similarity in such a case is:

$$S_{max}(\bar{y},x)=\max_{y \in} \mathcal{G}_{A(\bar{y})} s(y,x) \quad (19)$$

Note that this is similar to the marginalization case, but using a max operator instead of a sum. In this case, it is not possible to compute the similarity in an efficient manner.

Wildcards at Train and Test Time.

Now described is how to include wildcards in a training procedure. If wildcards appear at test time, it is expected that a system that exploits this information also at training time will perform better than one that does not. Given a training set that does not contain wildcards, it is straightforward to augment it by replicating the training and adding random wildcards to the text strings. The following options are provided to deal with wildcards at training time:

Ignore wildcards at training time. Then, at test time, ignore the wildcards or marginalize over them.

Marginalize wildcards at training time by constructing the "average" embedding of the label. Then, at test time, ignore the wildcards or marginalize over them.

Explicitly add a wildcard symbol to the alphabet, i.e., $A?=A+\{?\}$. In that case, the wildcard gets explicitly encoded by the $\phi_{A?}$ function. At test time it is possible to encode the wildcards using the same approach, but also to marginalize over them as before. The encoded wildcard symbol explicitly flags that some information is missing, so that the learning can take this information into account. In practice, this implies that the learned projection W will grow by $$\frac{k(k+1)}{2}$$

columns, where k is the number of levels of the SPOC representation. It is believed that these new degrees of freedom act as a "filler" model, capturing any effect of the wildcard that is not explicitly taken into account by the "regular" terms of W.

EXPERIMENTS

Experimental Set-Up

For experimental validation, an experiment was conducted on a dataset of license plate images. The dataset contained about 8,430 license plate images (4,215 are used for training and 4,215 for testing).

To extract image signatures, the Fisher vector framework is adopted (see PERRONNIN et al., "IMPROVING THE FISHER KERNEL FOR LARGE-SCALE IMAGE CLASSIFICATION", In ECCV, 2010, pages 1-14), with 64 Gaussians, projecting the 128-d SIFT features projected into 32 PCA components, computing the derivative only w.r.t. the means, and with a spatial pyramid of 1 single 4×2 level, for a total of 16,384 dims.

To embed the labels, the SPOC histograms were used including 4 levels and an alphabet A={0-9,A-Z} for a total of 540 dimensions (555 when including the ? symbol). Each independent region of the SPOC histogram is L2 normalized independently.

The dataset was augmented to include labels with wildcards. First, the dataset was replicated 3 times, for a total of 12,645 training samples and 12,645 testing samples. Then, two flavors were created of these augmented datasets. In the first one, one character of each label is randomly replaced with the wildcard symbol ?. In the second one, two characters are randomly replaced. Due to the random selection, it is possible to select the same character twice, and therefore labels in this set may contain one or two wildcards.

Learning of the similarity matrix W was performed with a structured SVM formalism following RODRIGUEZ et al., "LABEL-EMBEDDING FOR TEXT RECOGNITION", in BMVC, 2013, pages 1-11. To perform optimization, Stochastic Gradient Descent (SGD) with averaging over the last epochs was used. When learning without wildcards, 3,000 epochs were performed through the 4,215 training samples. At that point the results had converged. When training with wild-cards, where the training set is augmented with wildcards and contains three times as many training samples, for fair comparison only considered was 4,215 samples per epoch (otherwise the latter method would have the unfair advantage of being exposed to 3x more data).

To evaluate the results, each text label of the testing set was used as a query and used to retrieve all the images of the testing set using the different similarity measures. Precision is reported at one, i.e., is the first retrieved image, degrees of freedom act as a "filler" model, capturing any effect of the wildcard that is not explicitly taken into account by the "regular" terms of W.

The baseline accuracy when training and testing without wildcards is 95.0%.

TABLE 1

Precision at 1 using queries with wildcards at test time. No wildcards used during learning.

|  | 1 wildcard | Up to 2 wildcards |
| --- | --- | --- |
| Ignore wildcards | 89.6 | 79.9 |
| Marginalization | 89.7 | 79.9 |
| Max | 88.1 | — |

Training without Wildcards, Testing with Wildcard Queries.

The experiments were begun with the simplest case where the training procedure does not involve wildcards. Table 1 above shows the results of the three discussed similarity options (ignore wildcards, marginalize wildcards, or maximize over all possible symbols) using either 1 or up to 2 wildcards on the test queries. The "maximize" method was not evaluated with 2 wildcards since computing the distances with only 1 wildcard was already significantly more costly than with the other approaches. Notably, when training without wildcards, all methods perform similarly, although the maximization method seems to obtain slightly worse results. This is not surprising, since a single wrong match with a high score will take over the rest of the matches. As expected, when wildcards are not used during training, queries with up to two wildcards perform significantly worse than queries with only one wildcard.

Training with Wildcards, Testing with Wildcard Queries.

In the second set of experiments, training is performed with labels with wildcards. Training is performed with one wildcard when testing with one wildcard, and training is performed with up to two wildcards when testing with up to two wildcards. The results are shown below in Table 2. It is observable how, again, all combinations of either ignore or marginalize at train and test obtain very similar results. Explicitly encoding the ? symbol both at train and test times seems to obtain slightly worse results. However, training with the wildcard symbol and testing with marginalization obtains the best results. It is believed that training using the wildcard symbol gives more degrees of freedom, since information about the missing character and its position in the word is explicitly encoded in the SPOC histogram and exploited by the learning method. This leads to a more informed W matrix. At testing time, though, it is better to explicitly marginalize over all characters in the alphabet instead of encoding the wildcard symbol, to explicitly test all possible cases. This approach obtains significantly better results than the naive approach of ignoring the wildcards: 1.5% increase when using one wildcard, and 3.5% increase when using up to two wildcards. Also highlighted are the large differences in the results with respect to Table 1: approx. +4% with 1 wildcard and +10% with 2 wild-cards. It is clear that, when testing with wildcards, also training with wildcards is very important to reach a high accuracy.

TABLE 2

Precision at 1 using labels with wildcards both at train and test time.

| Train | Test | 1 wildcard | Up to 2 wildcards |
| --- | --- | --- | --- |
| Ignore | Ignore | 91.8 | 86.0 |
| Ignore | Marginalization. | 91.8 | 86.1 |
| Marginalize | Ignore | 91.5 | 85.8 |
| Marginalize | Marginalize | 91.5 | 86.4 |
| Wild sym | Wild sym | 90.9 | 84.3 |
| Wild sym | Marginalize | 93.3 | 89.4 |

Training with Wildcards, Testing without Wildcard Queries.

Finally, the option of using wildcards during learning is evaluated, even if it is not intended to test with wildcards. In these experiments, the "explicitly add wildcard symbol" option is used. As mentioned earlier, when training and testing with no wildcards, a baseline accuracy of 95.0% is achieved. When training with one or two wildcard symbols and testing with no wild-cards, an accuracy of 96.5% and 96.4% is achieved, respectively. This means that, even if a wildcard functionality at test time is not desired, it is beneficial to train with wildcards as this increases retrieval accuracy. One possible explanation for this somewhat surprising result is that adding wildcards during training can be interpreted as a noise injection. Noise (and especially Gaussian noise) injection at training time has long been acknowledged as a regularization technique leading to better classifiers. See, for instance, C. BISHOP, "TRAINING WITH NOISE IS EQUIVALENT TO TIKHONOV REGULARIZATION", Neural Computation, 1995, 8 pages. In other words, in the context of text-based license plate image search, adding wildcards at training time by dropping some characters and explicitly using a wildcard symbol is an effective way to add noise.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for comparing a queried character string including a wildcard character and a text image comprising:
   a character string image representation generator configured to embed a character string image representation of the queried character string including the wildcard into a common vectorial space based on features extracted from the queried character string including the wildcard character, the queried character string consisting of a sequence of a plurality of characters including the wildcard character, and the character string image representation including a spatial pyramid bag of characters representation including information indicating a location of the wildcard character relative to other characters included in the queried character string;
   a text image representation generator configured to embed a text image representation of the text image into the common vectorial space, the text image based on features extracted from the text image, and the text image including a sequence of a plurality of textual characters;
   a comparator configured to compute a similarity between the text image representation embedded in the common vectorial space and the character string image representation embedded in the common vectorial space;
   an output component configured to output information based on the computed similarity between the character string image representation embedded in the common vectorial space and the text image representation embedded in the common vectorial space; and
   a processor which implements the text string representation generator, text image representation generator, comparator, and output component.

2. A computer implemented method for comparing a queried character string and a text image comprising:
   for at least one queried character string including a sequence of characters including a wildcard character, extracting a set of features from the queried character string by partitioning the queried character string to form a spatial pyramid of regions and for each region generating a representation of the region including counting occurrences of each of a finite set of characters in the region;
   generating a character string image representation of the queried character string based on the region representations, the character string image representation including information indicating a location of the wildcard character relative to other characters included in the queried character string;
   embedding the character string image representation into a common vectorial space;
   extracting a set of features from the text image and generating a text image representation based thereon;
   embedding the text image into the common vectorial space; and
   computing a similarity function between the text image representation and the character string representation comprising embedding at least one of the character string representation and the text image representation with a matrix of learned parameters, the similarity being a function of the at least one embedded representation, and
   the learned parameters of the similarity function learned using a training set of text images that are each labeled with a respective character string including a wildcard character corresponding to text present in the image.

3. The method of claim 1, further comprising learning parameters of the similarity function using a training set of text images that are each labeled with a respective character string including a wildcard character corresponding to text present in the image.

\* \* \* \* \*